US008074219B2

(12) United States Patent
Duffy et al.

(10) Patent No.: US 8,074,219 B2
(45) Date of Patent: Dec. 6, 2011

(54) ORDER PRESERVATION IN DATA PARALLEL OPERATIONS

(75) Inventors: John Joseph Duffy, Renton, WA (US); David Callahan, Seattle, WA (US); Edward George Essey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1196 days.

(21) Appl. No.: 11/823,167

(22) Filed: Jun. 27, 2007

(65) Prior Publication Data
US 2009/0007137 A1 Jan. 1, 2009

(51) Int. Cl.
*G06F 9/46* (2006.01)
(52) U.S. Cl. .................. 718/100; 707/696; 707/737
(58) Field of Classification Search ................ None
See application file for complete search history.

(56) References Cited

U.S. PATENT DOCUMENTS

| | | | |
|---|---|---|---|
| 5,237,691 A | 8/1993 | Robinson et al. | |
| 5,337,410 A | 8/1994 | Appel | |
| 5,421,007 A * | 5/1995 | Coleman et al. ............... | 1/1 |
| 5,557,791 A | 9/1996 | Cheng et al. | |
| 5,610,603 A | 3/1997 | Plambeck | |
| 5,640,554 A * | 6/1997 | Take ............................... | 1/1 |
| 5,659,737 A | 8/1997 | Matsuda | |
| 5,745,392 A * | 4/1998 | Ergas et al. ............... | 708/203 |
| 5,999,729 A * | 12/1999 | Tabloski et al. ........... | 717/105 |
| 6,055,558 A * | 4/2000 | Lin et al. .................. | 718/100 |
| 6,088,705 A | 7/2000 | Lightstone et al. | |
| 6,212,617 B1 | 4/2001 | Hardwick | |
| 6,292,822 B1 | 9/2001 | Hardwick | |
| 6,366,911 B1 * | 4/2002 | Christy ..................... | 707/737 |
| 6,408,314 B1 * | 6/2002 | Liu ............................ | 707/752 |
| 6,427,148 B1 * | 7/2002 | Cossock .................... | 707/700 |
| 6,434,560 B1 * | 8/2002 | Case ........................ | 707/752 |
| 6,438,562 B1 * | 8/2002 | Gupta et al. .............. | 707/696 |
| 6,864,892 B2 | 3/2005 | Lavelle et al. | |
| 7,058,937 B2 | 6/2006 | Fu et al. | |
| 7,085,769 B1 * | 8/2006 | Luo et al. ................... | 1/1 |
| 2001/0020293 A1 * | 9/2001 | Uchihira et al. ........... | 717/4 |
| 2002/0091747 A1 | 7/2002 | Rehg et al. | |
| 2002/0194173 A1 | 12/2002 | Bjornson et al. | |
| 2003/0158885 A1 * | 8/2003 | Sager ........................ | 709/108 |

(Continued)

FOREIGN PATENT DOCUMENTS
WO 2005001687 A2 1/2005

OTHER PUBLICATIONS

Fox, et al., "Order-Preserving Minimal Perfect Hash Functions and Information Retrieval", Date: Jul. 1991, pp. 281-308, vol. 9, Issue: 3, ACM Press, New York, USA.

(Continued)

*Primary Examiner* — Emerson Puente
*Assistant Examiner* — Hiren Patel

(57) ABSTRACT

Various technologies and techniques are disclosed for preserving input element ordering in data parallel operations. This ordering may be based on element ordinal position in the input or a programmer-specified key-selection routine that generates sortable keys for each input element. Complex data parallel operations are re-written to contain individual data parallel operations that introduce partitioning and merging. Each partition is then processed independently in parallel. The system ensures that downstream operations remember ordering information established by certain other operations, using techniques that vary depending upon which categories the consumer operations are in. Data is merged back into one output stream using a final merge process that is aware of the ordering established among data elements.

15 Claims, 8 Drawing Sheets

U.S. PATENT DOCUMENTS

| | | | |
|---|---|---|---|
| 2004/0221138 A1* | 11/2004 | Rosner et al. | 712/218 |
| 2005/0050083 A1 | 3/2005 | Jin et al. | |
| 2005/0131893 A1* | 6/2005 | Von Glan | 707/5 |
| 2005/0144167 A1* | 6/2005 | Yamamoto | 707/7 |
| 2005/0146933 A1* | 7/2005 | Guterman et al. | 365/185.11 |
| 2005/0147240 A1 | 7/2005 | Agrawal et al. | |
| 2006/0155394 A1 | 7/2006 | Syeda-Mahmood | |
| 2006/0182046 A1* | 8/2006 | Dageville et al. | 370/260 |
| 2006/0218123 A1 | 9/2006 | Chowdhuri et al. | |
| 2007/0073949 A1* | 3/2007 | Fredrickson et al. | 710/243 |
| 2007/0250470 A1* | 10/2007 | Duffy et al. | 707/2 |
| 2008/0127145 A1* | 5/2008 | So et al. | 717/149 |

OTHER PUBLICATIONS

International Search Report and Written Opinion Received for PCT Application No. PCT/US2008/067138, mailed on Jan. 9, 2009, 11 pages.

"European Search Report", Mailed Date: Apr. 4, 2011, Application No. EP/08771207, Filed Date: Apr. 1, 2011, pp. 6.

* cited by examiner

ORDER PRESERVATION IN DATA PARALLEL OPERATIONS

BACKGROUND

Software programs have been written to run sequentially since the beginning days of software development. Steadily over time computers have become much more powerful, with more processing power and memory to handle advanced operations. This trend has recently shifted away from ever-increasing single-processor clock rates and towards an increase in the number of processors available in a single computer, i.e. away from sequential execution and toward parallel execution. Software developers want to take advantage of improvements in computer processing power, enabling their software programs to run faster as new hardware is adopted. With parallel hardware, however, this requires a different approach: developers must arrange for one or more tasks of a particular software program to be executed in parallel (sometimes called "concurrently"), so that the same logical operation can utilize many processors at one time, and deliver better performance as more processors are added to the computers on which such software runs.

When parallelizing previously-written sequential algorithms, it is often desirable to keep as much of the previous sequential program behavior as is possible. However, typical parallel execution of existing sequential logic introduces new behavioral characteristics and presents problems that can introduce challenges into the migration from sequential to parallel algorithms. Moreover, it is also possible that such a problem could represent changes to non-negotiable sequential behavior, prohibiting migration altogether. One category of such problems is that of preserving data ordering, either by ordinal position or keys generated based on programmer specified key-selection logic.

As an illustration, imagine a programmer wrote this program text, which uses a language integrated query comprehension as a way of representing a data parallel computation:

```
int[ ] A = ... generate some interesting input ...;
Array.Sort(A); // sort 'A' in place
int[ ] B = (from x in A select x*x).ToArray( );
```

The sequential algorithm preserves relative ordering among elements in 'A' for the output elements in 'B', simply by virtue of the sequential evaluation of the query whose results are assigned to 'B'. If the query comprehension is run in parallel using typical data parallel execution, the relative ordering among elements may become scrambled. As an example, imagine 'A' contains the elements {0, 1, 2, 3}; the programmer will likely expect that, after execution, 'B' contains {0, 1, 4, 9}. This problem can apply generally to all data parallel operations, not just query comprehensions.

SUMMARY

Various technologies and techniques are disclosed for preserving order in data parallel operations. Complex combinations (e.g. trees) of data parallel operations are re-written to contain data parallel operations that introduce partitioning and merging. Partitioning allows each partition to process a disjoint subset of the input in parallel, and the results are later merged back into one set of output for consumption. The system ensures that operations consuming the output of an order establishing operation, either directly or indirectly, remember necessary ordering information so that the merge operation can preserve the order using techniques that vary depending upon which categories the operations are in.

In one implementation, input element ordering is preserved in data parallel operations by performing various steps. Two kinds of ordering are supported: key- and ordinal-based. Both are modeled by using order keys: in the former, order keys are generated by applying a programmer-specified key-selection function against input elements, while in the latter, order keys are generated by extracting ordinal element position (e.g. with the data source is an array with indices). First, a complex operation, comprised of individual data parallel operations, is analyzed to label each operation in the data source with a respective category. In one implementation, two categories important to the discussion are: physically-reordering, in which an operation may disturb an existing ordering among elements (physically), and logically-reordering, in which an operation subsumes all previous ordering constraints on the elements in favor of a new ordering. Logically-reordering operations are typically also physically-reordering, but are not required to be. If no constituent operations in the complex operation are in the physically- or logically-reordering category, then the input data elements' order keys are simply remembered, if order matters, so that they may be used during the merge step. If one or more operations are in the physically-reordering category, then order keys must be propagated during the reordering so that they can be recovered during the merge step, and the merge step must perform a sort to reestablish the correct intra-partition ordering. If one or more operations are in the logically-reordering category, then the operation that is closest to the merge is responsible for providing order key information required to reconstruct order for the merge operation. If multiple logically-reordering operations exist, only the one closest to the merge places the aforementioned requirements on physically-reordering operations that consume its output directly or indirectly. The final merge process is then performed using one of various techniques to sort elements by order keys to produce a final ordered set.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that preserves order in data parallel operations, but the technologies and techniques also serve other purposes in addition to these. In one implementation, one or more of the techniques described herein can be implemented as features within a framework program such as MICROSOFT® .NET Framework, or from any other type of program or service that handles data parallel operations in programs.

In one implementation, a system is provided that re-writes parallel operations to contain operations that introduce partitioning and merging. Each partition is processed in parallel, and logical element position is preserved. The data is merged back into one output stream to produce a final ordered set. In one implementation, the system allows ordinal order preservation, regardless of the partitioning strategy chosen, to ensure that the relative ordering of any two elements in the output, e0 and e1, is equivalent to the relative ordering of the corresponding elements in the input (or those elements used to generate e0 and e1, in the case of e.g. a mapping operation).

In one implementation, the system is operable to assist with key-based order preservation. Sometimes an ordering is established among elements that are not necessarily ordinal-based. A sort operation, for instance, logically and physically reorders the data. One way to preserve proper order when parallelizing such operations is to remember the key information for long enough to delay the merge until the end, where at least one merge operation will be incurred anyway. This is quite similar to ordinal order preservation: in fact, as described below, ordinal order preservation is a special case of key-based order preservation, where the original element indices are modeled as sort keys.

Figure 1:
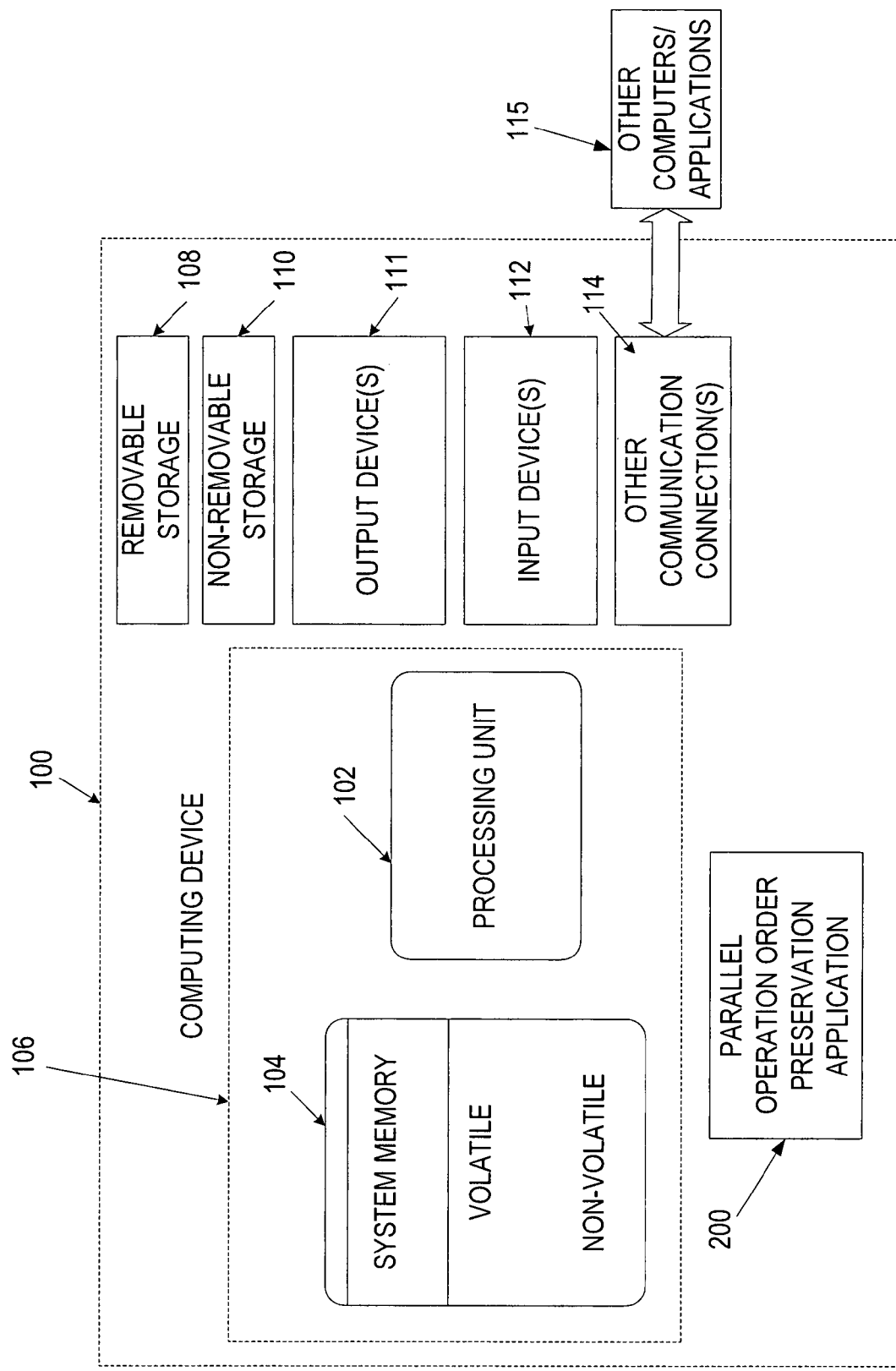
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes parallel operation order preservation application 200. Parallel operation order preservation application 200 will be described in further detail in FIG. 2.

Figure 2:
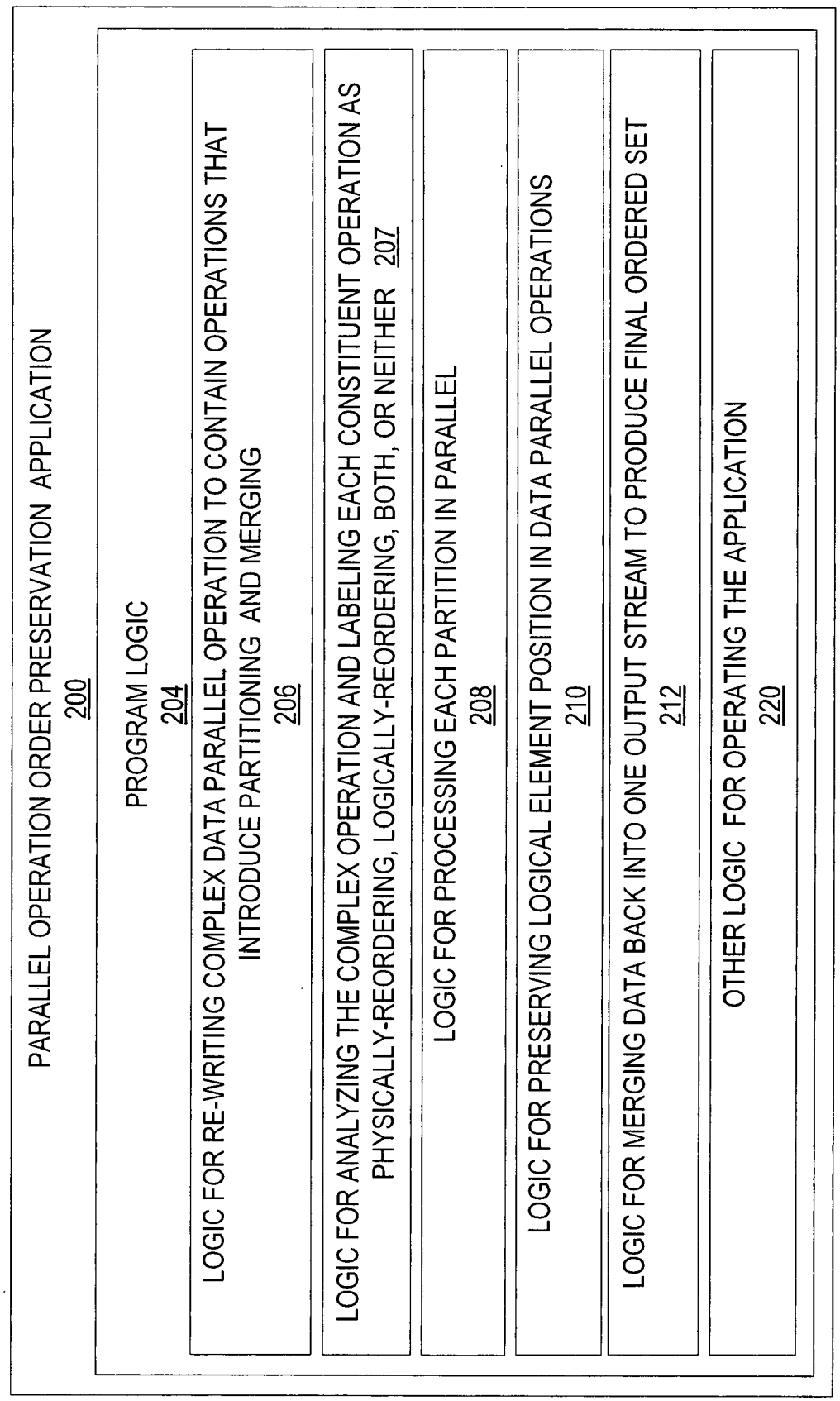
FIG. 2 is a diagrammatic view of a parallel operation order preservation application of one implementation operating on the computer system of FIG. 1.

Turning now to FIG. 2 with continued reference to FIG. 1, a parallel operation order preservation application 200 operating on computing device 100 is illustrated. Parallel operation order preservation application 200 is one of the application programs that reside on computing device 100. However, it will be understood that parallel operation order preservation application 200 can alternatively or additionally be embodied as computer-executable instructions on one or more computers and/or in different variations than shown on FIG. 1. Alternatively or additionally, one or more parts of parallel operation order preservation application 200 can be part of system memory 104, on other computers and/or applications 115, or other such variations as would occur to one in the computer software art.

Parallel operation order preservation application 200 includes program logic 204, which is responsible for carrying out some or all of the techniques described herein. Program logic 204 includes logic for re-writing a complex data parallel operation to contain operations that introduce partitioning and merging 206 (as described below with respect to FIG. 3); logic for analyzing the complex operation and labeling each constituent operation as physically-reordering, logically-reordering, both, or neither 207 (as described below with respect to FIG. 5); logic for processing each partition in parallel 208 (as described below with respect to FIG. 3); logic for preserving logical element position in data parallel operations 210 (as described below with respect to FIGS. 4 and 5); logic for merging data back into one output stream to produce a final ordered set 212 (as described below with respect to FIGS. 3 and 5); and other logic for the operating application 220.

Figure 3:
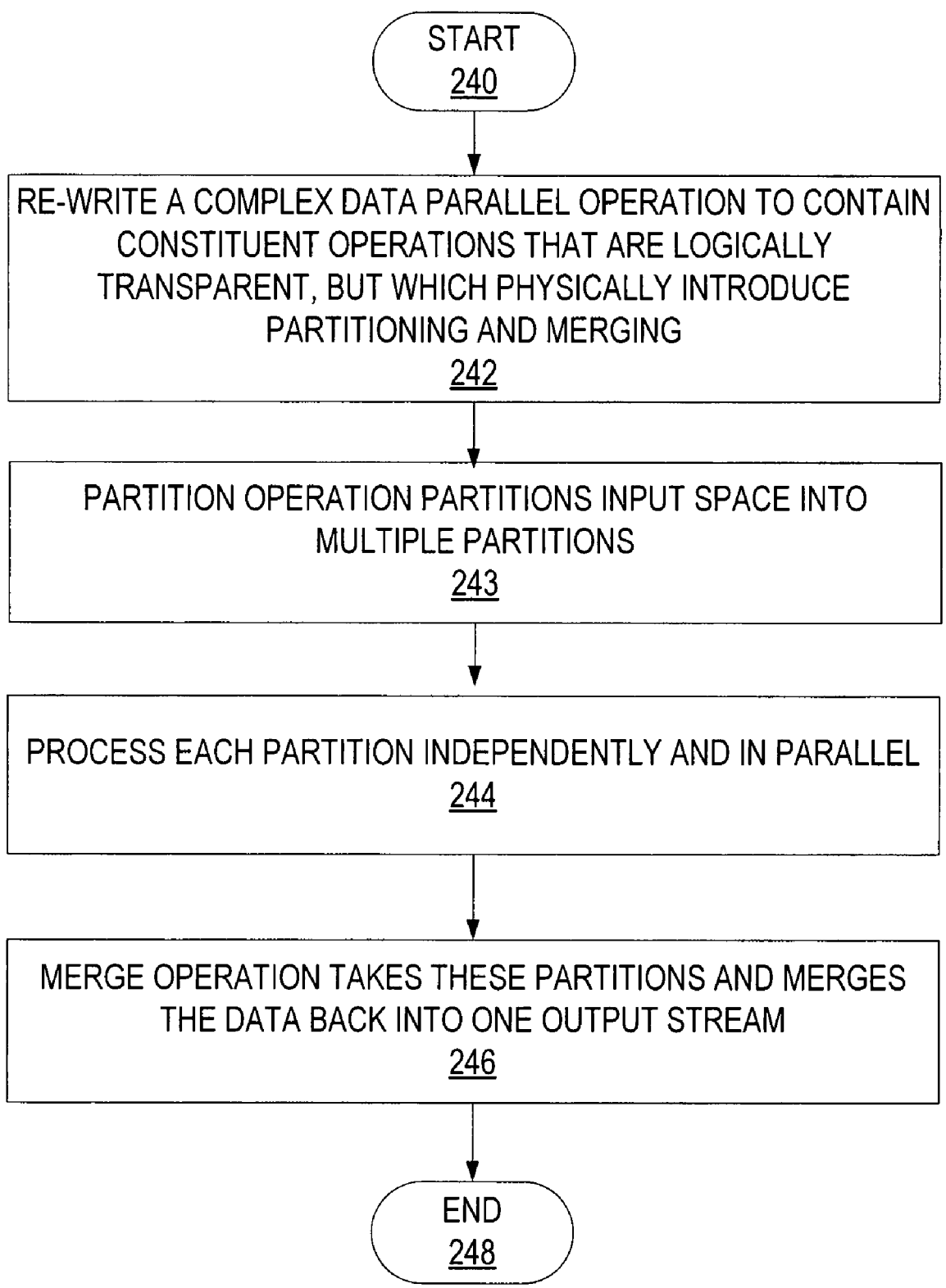
FIG. 3 is a high-level process flow diagram for one implementation of the system of FIG. 1.

Turning now to FIGS. 3-8 with continued reference to FIGS. 1-2, the stages for implementing one or more implementations of parallel operation order preservation application 200 are described in further detail. In some implementations, the processes of FIGS. 3-8 are at least partially implemented in the operating logic of computing device 100. FIG. 3 is a high level process flow diagram for parallel operation order preservation application 200. The process begins at start point 240 with re-writing a complex data parallel operation to contain constituent operations that are logically transparent, but which physically introduce partitioning and merging (stage 242). The term "complex operation" as used herein is meant to include the composition of one or more data parallel operations into a more complex operation, such as a tree structure in which nodes are data parallel operations, a singular operation, linked list of operations, graph, etc. In one implementation, a partition operation simply partitions the input space into multiple disjoint partitions (stage 243) using one of a variety of techniques: dynamically, on-demand generating "chunks" of interesting size, partitioning into disjoint size by computing indices for the region's boundaries, striping data in smaller granules, hash-coding based on a certain key-selection function, and so on. Each partition is then processed independently and in parallel (stage 244). The merge operation later takes these partitions and merges the data back into one output stream (stage 246). The process ends at end point 248.

In between the partition and merge steps, operations like projection, filtering, joining, sorting, etc. can be found. Most operations fall into one of three categories:

1. Logical order reordering.
2. Physical order reordering.
3. Both (physical and logical order reordering).
4. Neither (physical and logical order preserving).

A sort is an example of category #1: the elements are logically reordered, in that the ordering established by the sort must be preserved in the final set, which also means that whatever ordering information we had previously been maintaining is now obsolete. A sort may optionally physically rearrange elements, in which case it is in category #3. A hash repartitioning operation is an example of something in category #2: elements might be redistributed to other partitions, based on a key-selection function, causing an unpredictable and nondeterministic interleaving of elements among the partitions. But the repartitioning operation is solely meant to physically distribute elements, and has no impact to the logical ordering established among elements. Most operations fall into category #4: projection, filtering, etc., which neither reorder elements physically nor establish any sort of logical ordering information that must be preserved. These are just a few non-limiting examples, as there are obviously many more examples of operations in each category. Note that an operation in any category may omit input elements from its output in any category, e.g. filters and joins. Some examples of preserving logical element ordering for such operations are described in further detail in FIGS. 4-8.

Figure 4:
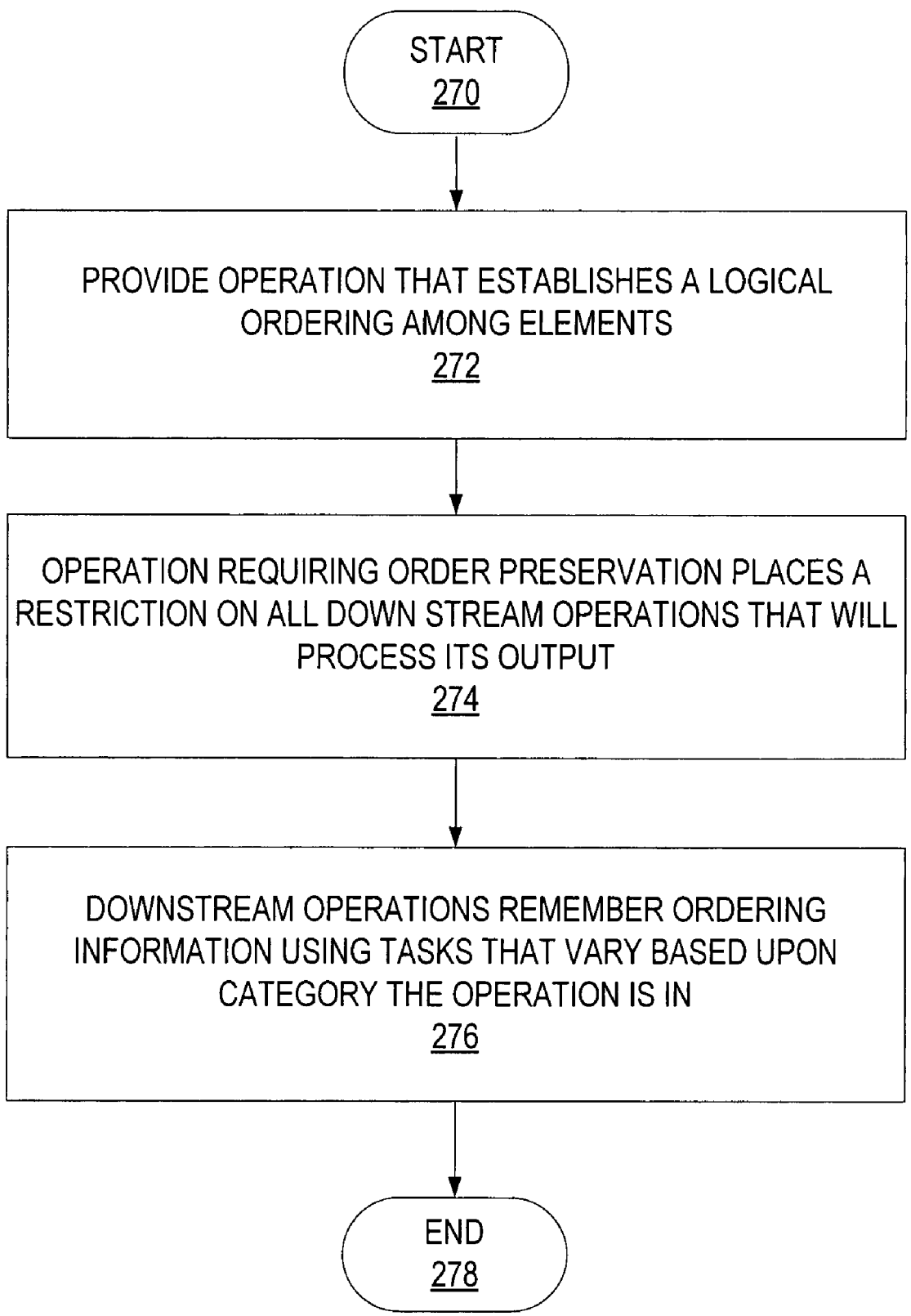
FIG. 4 is a process flow diagram for one implementation of the system of FIG. 1 illustrating the high level stages involved in preserving existing element position in data parallel operations.

FIG. 4 illustrates one implementation of the high level stages involved in preserving existing element position in data parallel operations. The process begins at start point 270 with the providing an operation that establishes a logical ordering among elements (stage 272). The establishment of logical ordering might take the form of requiring that element ordinal positions are preserved, or alternatively may take the form of a sort operation with a programmer-specified key-selection routine which, given an element, generates a key used for ordering. The operation requiring order preservation places a restriction on all downstream operations that will process its output (stage 274). The term "downstream operation" as used herein means any operation that directly or indirectly consumes the output of an operation. These downstream operations remember the ordering information using tasks that vary based upon which category the operation is in (stage 276), i.e. physically-reordering, logically-reordering, both, or neither. The process ends at end point 278.

Figure 5:
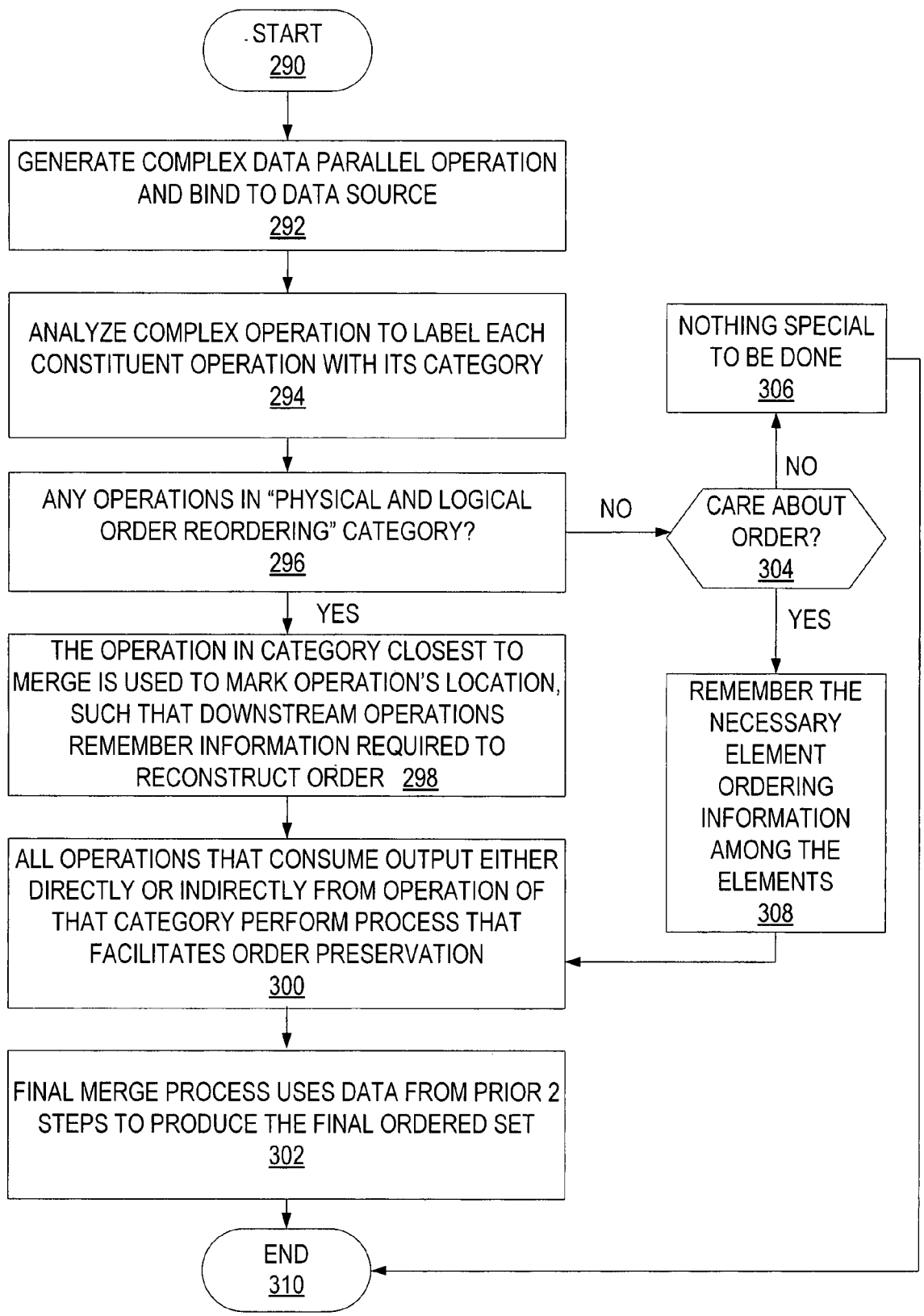
FIG. 5 is a process flow diagram for one implementation of the system of FIG. 1 illustrating the more detailed stages involved in preserving existing element position in data parallel operations.

FIG. 5 illustrates one implementation of the more detailed stages involved in preserving existing element position in data parallel operations. The process begins at start point 290 with generating a complex data parallel operation out of individual data parallel operations and binding it to a data source (stage 292). The system then analyzes the complex operation to label each constituent operation with its category (stage 294). If there are any operations in the "physical and logical order reordering" category (decision point 296), then the operation in that category closest to the merge is used to mark the individual operation's location within the complex operation, such that all downstream operations must remember the information that is required to reconstruct order during the merge (stage 298). All operations that consume output either directly or indirectly from such an operation of that category perform the process that facilitates order preservation (stage 300). The final merge process uses data from the prior 2 steps to produce the final ordered set (stage 302) and the process ends at end point 310.

If, however, there are not any operations in the "physical and logical order reordering" category (decision point 296), and if the system does care about the order (decision point 304), then the system will remember the necessary element ordering information among the elements (stage 308), e.g. indices for ordinal preservation or keys for sorts, and will then proceed to stage 300 and 302 with preserving order preservation and performing the final merge process as previously described. If the system does not care about order, then nothing special is done (stage 306) and the process ends at end point 310.

Figure 6:
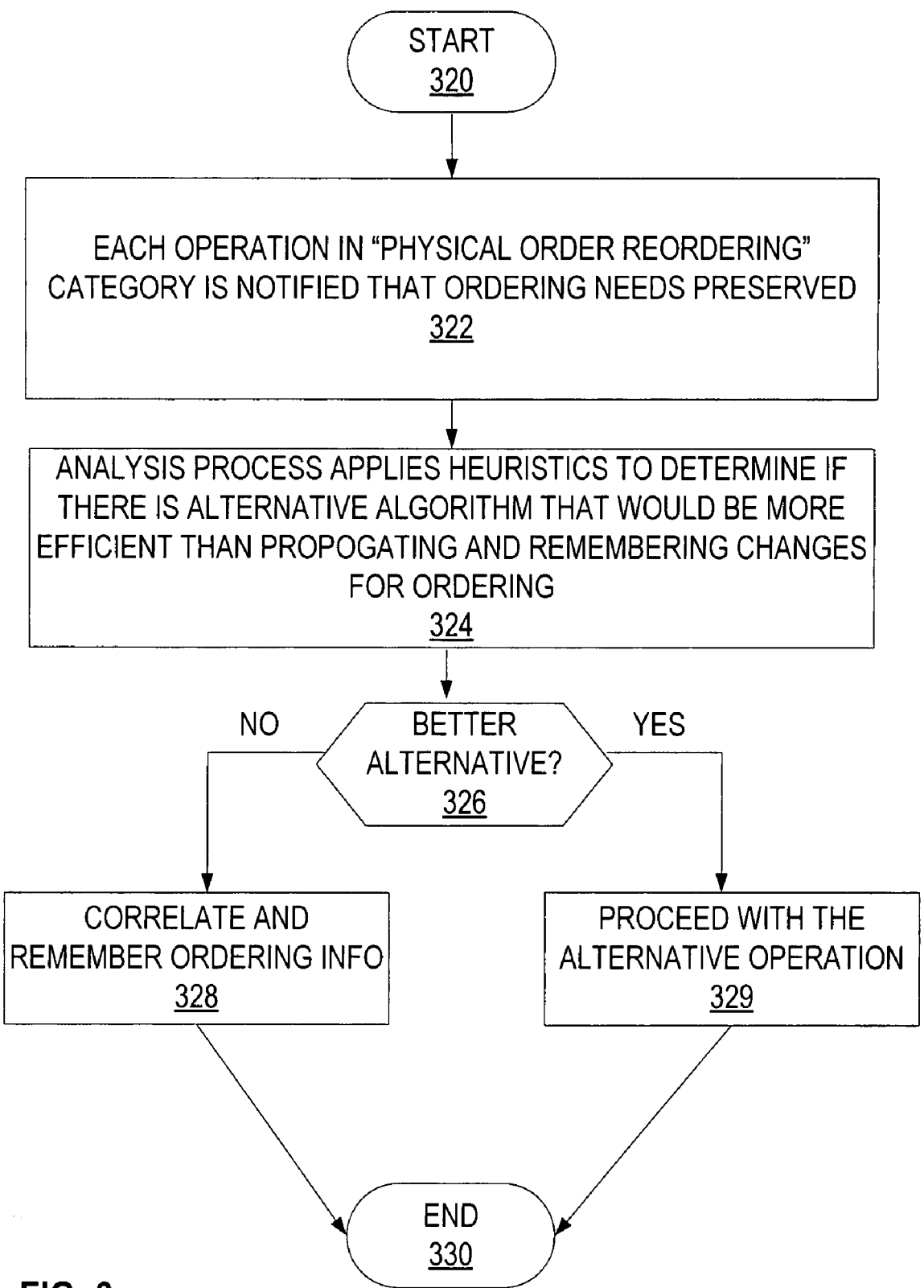
FIG. 6 is a process flow diagram for one implementation of the system of FIG. 1 illustrating the stages involved in providing a process that facilitates order preservation.

FIG. 6 illustrates one implementation of the stages involved in providing a process that facilitates order preservation. The process begins at start point 320 with each operation in the "physical order reordering" category being notified that ordering needs preserved (stage 322). An analysis process applies heuristics to determine if there is alternative algorithm that would be more efficient than propagating and remembering for the logical element ordering information (stage 324). If the analysis process reveals there is a better alternative (decision point 326), then the system proceeds with the alternative operation (stage 329). If there is not a better alternative (decision point 326), then the system correlates and remembers the ordering information, as previously described (stage 328). The process ends at end point 330.

Figure 7:
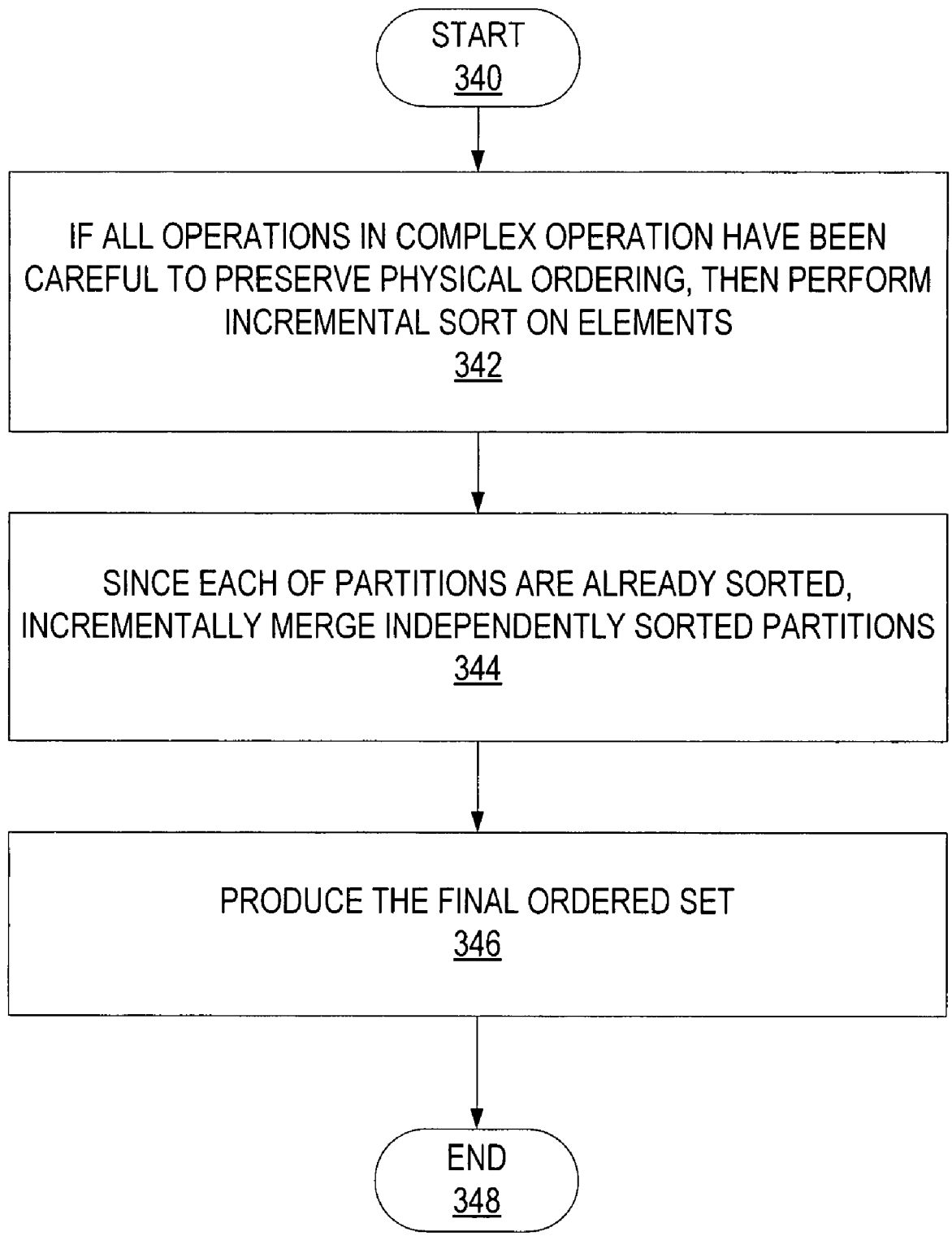
FIG. 7 is a process flow diagram for one implementation of the system of FIG. 1 that illustrates the stages involved in providing a final merge process that produces the final ordered set.

FIG. 7 illustrates one implementation of the stages involved in providing a final merge process that produces the final ordered set. The process begins at start point 340 with performing an incremental sort on the elements if all constituent operations in the complex operation have been careful to preserve physical ordering (stage 342). Since each of the partitions are already sorted, there is no need to independently resort each partition. For cases in which the logical-to-physical ordering relationship has not been preserved during execution of the complex operation, the final merge process must first reconstruct the ordering among each partition, as described in FIG. 8. It does this by performing independent sort operations on each partition in parallel. The merge process then proceeds to incrementally merges the independently sorted partitions, by using one of many techniques (stage 344), e.g. a heap data structure to remember previous comparison results, a merge sort, etc., to produce the final ordered set (stage 346). The process ends at end point 348.

Figure 8:
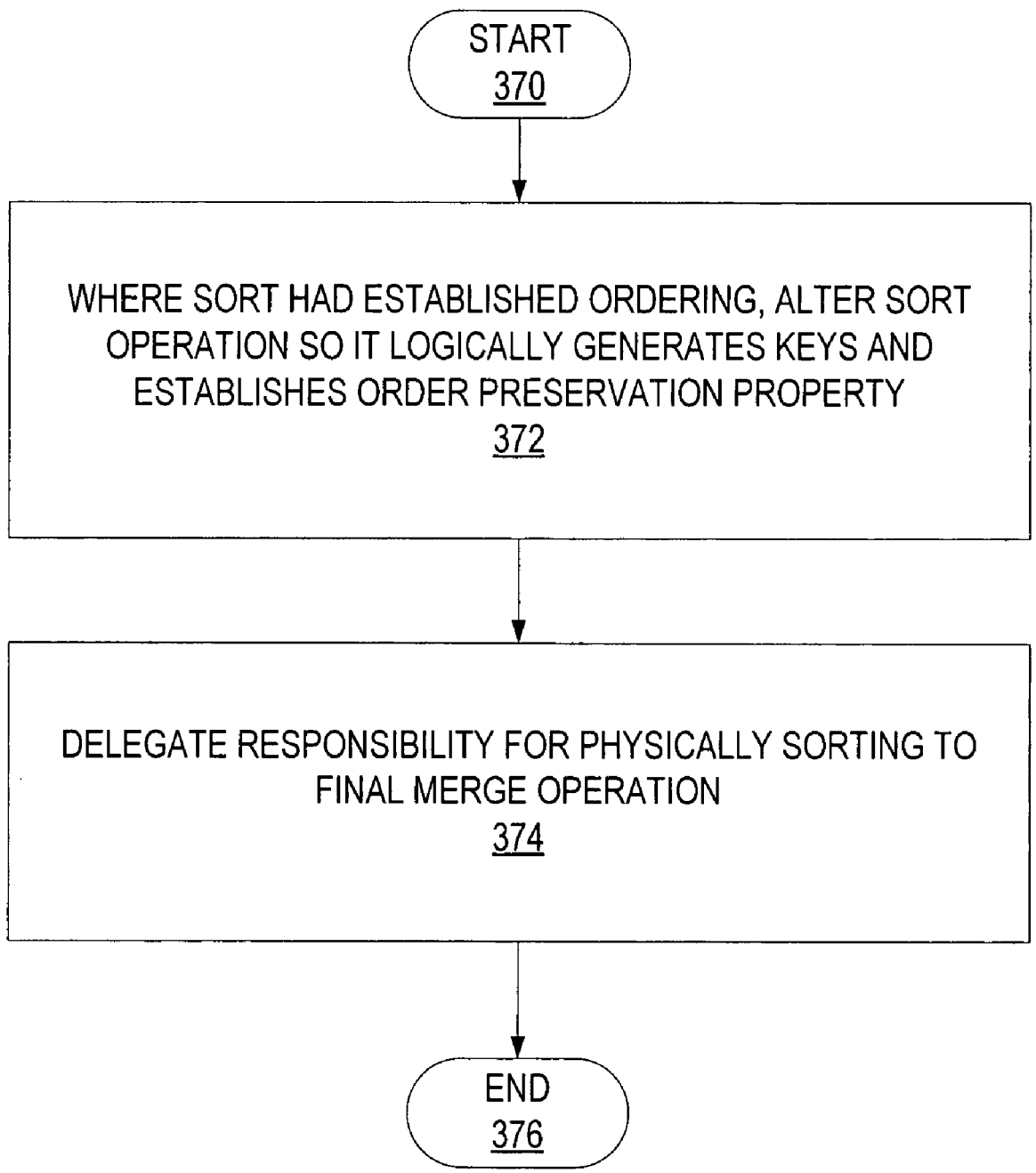
FIG. 8 is a process flow diagram for one implementation of the system of FIG. 1 that illustrates a variation for performing a data parallel sort operation on the input to match the physical ordering with logical ordering.

FIG. 8 illustrates one implementation of the stages involved in performing a data parallel sort operation on the input, in which the logical ordering among elements is changed but the physical reordering (i.e. the sort) is deferred to the final merge. If multiple sorts appear in a complex operation, this avoids needing to perform multiple sorts when only the effects of the last will remain in the final merged output anyhow. The process of FIG. 8 is also used when all operations have not been careful to preserve physical ordering, as mentioned above. The process begins at start point 370 altering the sort operation so it logically generates keys and establishes order preservation property (stage 372). The system then delegates responsibility for physically sorting the elements to the final merge operation (stage 374). The process ends at end point 376.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable storage medium having computer-executable instructions for causing a computer to perform steps comprising:

re-writing a complex data parallel operation to contain data parallel operations that introduce partitioning and merging, the re-writing comprising analyzing the complex data parallel operation to label the data parallel operations as logical reordering, physical reordering, or both logical and physical reordering, and according to the labels identifying the data parallel operations as operation types comprising logical reordering, physical reordering, or both logical and physical reordering, wherein a physical reordering operation type reorders corresponding elements in physical storage without affecting the logical ordering of corresponding elements, a logical reordering operation type logically reorders corresponding elements without affecting ordering of the elements in physical storage, and a logical and physical operation type both logically reorders corresponding elements and reorders the corresponding elements in physical storage;

processing each resulting partition in parallel resulting in respective data outputs;

based on the identified operation types, establishing logical order information during the execution of data parallel operations;

performing an order preservation process that facilitates order preservation in all of the operations that consume output from a logical reordering operation closest to a merge operation that merges output of the operations, wherein if no operations are identified as physical or logical reordering operations, and if an ordering requirement is determined to be present, then input data relative ordering among the elements is preserved during the merge operation; and merging the data outputs back into one output stream using a final merge process that preserves a desired logical ordering of the complex data parallel operation.

2. The computer-readable storage medium of claim 1, wherein the logical order information preserved is derived from a position of an element in an input to the data parallel operations.

3. The computer-readable storage medium of claim 1, wherein the final merge process is operable to produce a final ordered set from the logical order information.

4. The computer-readable storage medium of claim 1, wherein the final merge process is operable to perform an incremental sort on elements if all operations have preserved physical ordering.

5. The computer-readable storage medium of claim 4, wherein the one output stream contains ordered results of the final merge process.

6. The computer-readable storage medium of claim 1, wherein the final merge operation is responsible for sorting and merging if all operations do not preserve physical ordering.

7. The computer-readable storage medium of claim 6, wherein sorts with established ordering are altered to generate keys that establish a logical order preservation property.

8. The computer-readable storage medium of claim 1, wherein the order information preserved is derived from a key-selection function which extracts a sort key from each element in an input to the data parallel operations.

9. A method performed by a computer for preserving relative input element positions in the output of the execution of a complex data parallel operation that is part of an application being executed by the computer, the application comprised of executable code, the method comprising the steps of:

accessing the complex data parallel operation of the application that establishes a logical ordering among elements and requires order preservation; and partitioning the complex data parallel operation into a plurality of parallel-executed constituent operations on respective disjoint partitions of the elements, where the constituent operations reorder the elements in their respective partitions such that the elements of each partition are in an order relative to each other that is different than if they had been processed in non-parallel fashion by the complex data parallel operation;

labeling each constituent operation with a label as either a physical reordering operation but not a logical reordering operation, a logical reordering operation but not a physical reordering operation, or a physical and logical reordering operation, analyzing the constituent operations according to the labels to identify types of the constituent operations, wherein a physical reordering operation reorders corresponding elements in physical storage without affecting the logical ordering of corresponding elements, a logical reordering operation logically reorders corresponding elements without affecting ordering of the elements in physical storage, and a logical and physical operation both logically reorders corresponding elements and reorders the corresponding elements in physical storage; and ensuring that downstream operations have access to ordering information about the logical ordering using techniques that vary according to the identified types of the constituent operations, including performing an order preservation process that facilitates order preservation in all of the operations that consume output from a logical reordering operation closest to a merge operation that merges output of the operations, wherein if any constituent operations are in a logical order reordering category, or the physical and logical reordering category, then a constituent operation having the logical order reordering label that is closest to a merge operation that merges elements processed by the constituent operations stores information required to subsequently reconstruct the logical order.

10. The method of claim 9, wherein the complex data parallel operation is analyzed to label each constituent operation with a respective category, the respective category being selected from the group consisting of a physical order reordering category, a logical order reordering category, a physical and logical order reordering category, and a none of the above category.

11. The method of claim 9, wherein all constituent operations in a physical reordering category that consume output from the closest operation to the merge store information required to reconstruct order during the merge operation.

12. The method of claim 11, wherein the order preservation process comprises:
   notifying each constituent operation in a physical order reordering category that ordering needs to be preserved; and
   if there is an alternative algorithm that is determined to be more efficient than storing changes for ordering, which is not in the physical order reordering category, then proceeding with the alternative operation.

13. The method of claim 12, further comprising:
   if there is not the alternative algorithm that is determined to be more efficient than remembering changes for ordering, then proceeding with correlating and storing changes.

14. The method of claim 12, wherein heuristics are used for the determination about the alternative algorithm.

15. A method for preserving existing ordinal element position in data parallel operations, the method performed by a computer that loads a data source into memory of the computer from where it is processed by a processor of the computer, the method performed by the processor and comprising the steps of:
   retrieving the data source comprised of elements and a complex data parallel operation, the complex data parallel operation comprised of operations;
   re-writing a complex data parallel operation to contain data parallel operations that introduce partitioning and merging, the re-writing comprising analyzing the complex data parallel operation to label each operation in the data source with a respective category, wherein some of the operations are identified as logical reordering operations and some of the operations are identified as physical reordering operations, wherein a physical reordering operation reorders corresponding elements in physical storage without affecting the logical ordering of corresponding elements, a logical reordering operation logically reorders corresponding elements without affecting ordering of the elements in physical storage, and a logical and physical operation both logically reorders corresponding elements and reorders the corresponding elements in physical storage;
   for the operations that are identified as logical reordering operations, storing information to allow reconstruction of order for an operation identified as a logical reordering operation that is closest to a merge operation that merges outputs of the operations;
   performing an order preservation process that facilitates order preservation in all of the operations that consume output from the logical reordering operation closest to the merge operation, wherein if no operations are identified as physical or logical reordering operations, and if an ordering requirement is determined to be present, then input data relative ordering among the elements is preserved during the merge operation; and
   performing the merge operation to produce a final ordered set.

* * * * *